(12) United States Patent
Dey et al.

(10) Patent No.: US 7,345,873 B2
(45) Date of Patent: Mar. 18, 2008

(54) SYSTEM AND METHOD FOR COOLING ELECTRONIC SYSTEMS

(75) Inventors: Subhrajit (nmn) Dey, Karnataka (IN); Petrus Joannes Joseph Moeleker, Latham, NY (US); Chellappa (nmn) Balan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/953,755

(22) Filed: Sep. 29, 2004

(65) Prior Publication Data

US 2006/0067046 A1    Mar. 30, 2006

(51) Int. Cl.
*H05K 7/20* (2006.01)
*H05K 5/00* (2006.01)
*A47B 77/08* (2006.01)
*H01L 23/34* (2006.01)

(52) U.S. Cl. ............... 361/695; 361/691; 361/694
(58) Field of Classification Search ........ 361/687–695, 361/829, 8, 317, 725–727, 816, 685; 454/184; 236/49.1, 49.5; 62/259.2; 165/122, 80.3
See application file for complete search history.

(56) References Cited

U.S. PATENT DOCUMENTS

| | | | |
|---|---|---|---|
| 5,321,581 A | | 6/1994 | Bartilson et al. |
| 5,940,266 A | * | 8/1999 | Hamilton et al. .......... 361/695 |
| 5,949,646 A | * | 9/1999 | Lee et al. .................. 361/695 |
| 6,000,464 A | | 12/1999 | Scafidi et al. |
| 6,483,699 B1 | * | 11/2002 | Salmonson et al. ........ 361/687 |
| 6,504,718 B2 | * | 1/2003 | Wu ........................... 361/695 |
| 6,525,935 B2 | * | 2/2003 | Casebolt .................... 361/687 |
| 6,525,936 B2 | | 2/2003 | Beitelmal et al. |
| 6,574,100 B1 | * | 6/2003 | Anderson ................... 361/687 |
| 6,704,196 B1 | * | 3/2004 | Rodriguez et al. ......... 361/687 |
| 6,721,180 B2 | * | 4/2004 | Le et al. ..................... 361/695 |
| 6,744,632 B2 | | 6/2004 | Wilson et al. |
| 7,042,722 B2 | * | 5/2006 | Suzuki et al. .............. 361/695 |
| 2003/0121645 A1 | | 7/2003 | Wang |
| 2003/0218850 A1 | * | 11/2003 | Kubo et al. ................ 361/103 |

* cited by examiner

*Primary Examiner*—Jayprakash Gandhi
*Assistant Examiner*—Zachary M Pape
(74) *Attorney, Agent, or Firm*—Cantor Colburn LLP (57) ABSTRACT

A cooling system for cooling a plurality of electronic components comprises a centralized source comprising at least one micro cooler configured to deliver a flow of a cooling medium and a plurality of baffles configured to redistribute the cooling medium over the electronic components. The electronic components are situated in an enclosure.

43 Claims, 8 Drawing Sheets

SYSTEM AND METHOD FOR COOLING ELECTRONIC SYSTEMS

BACKGROUND OF THE INVENTION

The present invention relates generally to the cooling of electronic components, and particularly to the use of fans for cooling electronic components.

The cooling of electronic components such as high power density devices, (HPDDs) including high power density integrated circuits (IC's) and central processing units (CPU's) for example, is a significant consideration in the design of computer servers, military avionic equipment, medical imaging equipment, and other systems employing high power density electronic devices. The term HPDD used herein refers to heat generating devices having a heat flux in excess of 10 Watts-per-square-centimeter. In addition to having variations in heat flux, HPDDs have various peak permissible temperatures which also affect cooling requirements Electronic systems are being designed with for greater computational speed and power and smaller footprints. These design goals result in a HPDD that generates a lot of heat in a small area/volume. Heat dissipation is important in order to avoid IC and CPU degradation. Power densities of some electronic systems are as high as about 200 watts per square centimeter (W/sq-cm), and the trend appears to be moving upward. In addition to heat dissipation requirements that result from heat generation, enclosure size constraints present design challenges. For example, conventional computer servers typically employ circuit boards that are housed in enclosures with a height restriction of 1.75 inches, referred to as a 1U application, with multiple circuit boards being stacked adjacent one another in a rack chassis. With a typical electronic component having an ambient use temperature of no greater than about 120 degree-Celsius (deg-C.) and a junction temperature restriction of about 90 deg-C., cooling systems are employed to transfer the heat of the HPDD to the surrounding ambient. Typical cooling systems include fans, blowers, heat sinks, and refrigeration systems, which tend to increase in size as the heat transfer demands increase.

Accordingly there is a need for an efficient thermal management for electronic components including high power density devices.

BRIEF DESCRIPTION OF THE INVENTION

In one aspect, a cooling system for cooling a plurality of electronic components comprises a centralized source comprising at least one micro cooler configured to deliver a flow of a cooling medium and a plurality of baffles configured to redistribute the cooling medium over the electronic components. The electronic components are situated in an enclosure.

In yet another aspect, a cooling system for cooling a plurality of electronic components comprising at least one CPU and a set of remaining electronic components, comprises a centralized source configured to deliver a flow of a cooling medium to the CPU and generate an exit stream of the cooling medium. The cooling system further comprises a plurality of baffles configured to redistribute the exit stream to cool the remaining set of electronic components, wherein the CPU and remaining set of electronic components are situated in an enclosure.

In another aspect, a method for cooling a plurality of electronic components comprises delivering a cooling medium from at least one micro cooler, and redistributing the cooling medium using a plurality of baffles over the plurality of electronic components.

In yet another aspect, a method for cooling a plurality of electronic components comprising at least one CPU and a remaining set of electronic components, comprises delivering a cooling medium from a centralized source and distributing the cooling medium over the CPU and generating an exit stream. The method further comprises redistributing the exit stream using a plurality of baffles over the remaining set of electronic components.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
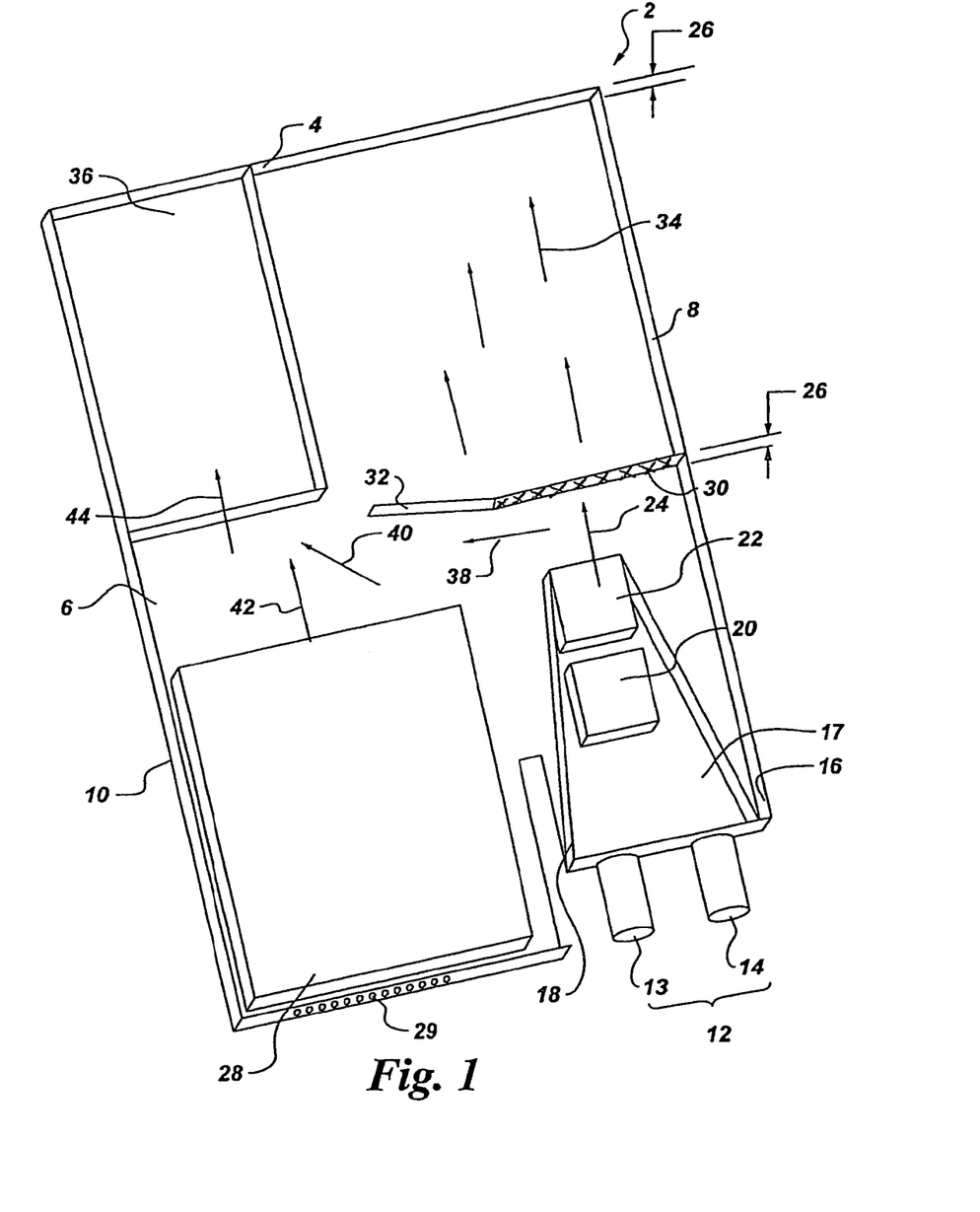
FIG. 1 illustrates an exemplary cooling system for electronic components.

Disclosed herein are cooling systems for cooling a plurality of electronic components. The cooling system comprises a centralized source configured to deliver a flow of a cooling medium and a plurality of baffles configured to redistribute the cooling medium over the electronic components. The electronic components are situated in an enclosure. FIG. 1 illustrates an exemplary cooling system 2 for cooling electronic components. The electronic components are enclosed in an enclosure 4. The cooling system 2 comprises a centralized source 12 configured to deliver a flow of a cooling medium over the electronic components situated within the enclosure 4.

In some embodiments, the electronic components comprise high power density device such as a high-end integrated circuit (IC) for use in a server computer system using at least one fan, such as a micro compressor, and a high flux heat exchanger, herein after called a micro cooler. The fan is sized for applications having a dimensional restriction of 1.75 inches ("1U" applications). In some embodiments, the fan may be sized for 2U applications. In some embodiments, the centralized source 12 comprises at least one micro cooler. As illustrated in FIG. 1, the centralized source 12 comprises two fans such as micro coolers 13 and 14. The micro coolers 13 and 14 are designed to deliver high flux of cooling medium such as air. The term high flux air used herein refers to airflow on the order of about at least 34 CFM (cubic feet per minute).

In an exemplary embodiment described herein, the enclosure 4, in which the electronic components are situated, is a computer server box. The enclosure 4 is configured to have a bottom surface 6, a top surface (not shown) and two side-walls 8 and 10. While the embodiments described herein depict a computer server box as an exemplary high power density device, it will be appreciated that the disclosed cooling systems may also be applicable to other high power density devices, such as military avionics and medical imaging components and equipment, for example. The electronic components described herein are heat-generating devices. These components are required to be cooled to a certain temperature for enhanced life.

The electronic components typically include, for example, a plurality of central processing units (CPUs) 20 and 22, disk drive 28, and a power supply unit 36. The enclosure 4 may also comprise other components including but not limited to a graphic card (not shown). In operation, the cooling medium such as air from the micro coolers 13 and 14 is first blown into the CPUs 20 and 22 and generates an exit stream 24. The cooling system may further comprise converging channels 16 and 18 wherein the CPUs 20 and 22 are placed in series (with respect to centralized source 12) within a converging duct 17 formed by the vertically placed solid converging channels 16 and 18. In an alternative embodiment (not shown), CPUs 20 and 22 are situated in parallel with respect to centralized source 12.

The converging duct 17 ensures that the CPUs receive at least some flow of the cooling medium even when one of the micro coolers fails. The CPUs are the highest power density device in the server box, and an efficient cooling system is required to enhance the life of the CPUs 20 and 22. Accordingly, in the cooling system 2, as illustrated in FIG. 1, the cooling medium is first blown over the CPUs 20 and 22. The temperature of the cooling medium is lowest at the inlet of the micro coolers 13 and 14.

Figure 2:
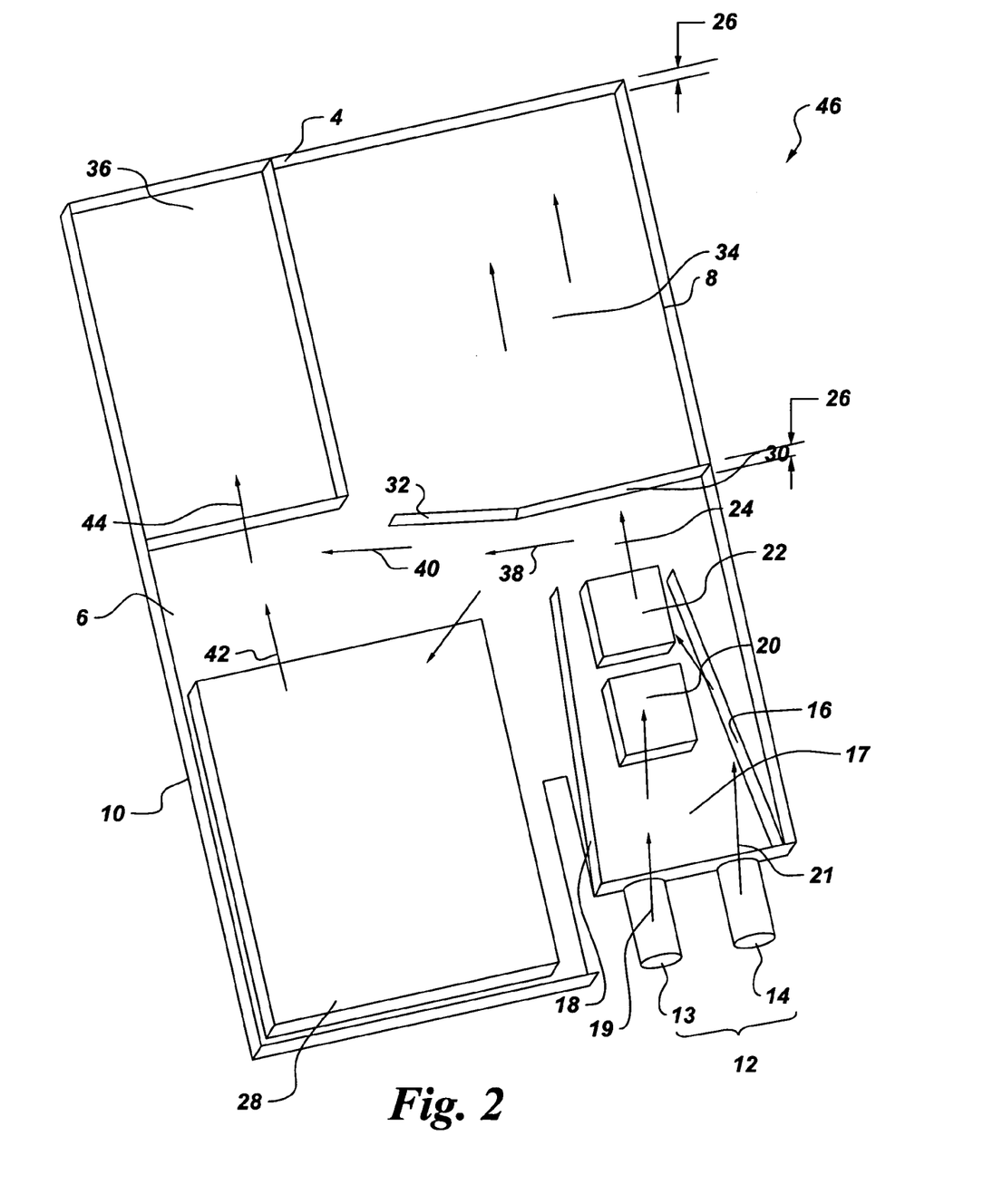
FIG. 2 illustrates a second exemplary cooling system for electronic components.

Embodiments with converging channels 16 and 18 provide an increase in velocity as the cooling medium passes over the first CPU 20. The increased velocity enhances the coefficient of heat transfer. Although the temperature of the cooling medium increases as the cooling medium flows through the converging channels 16 and 18, particularly due to the enhanced coefficient of heat transfer, cooling of the second CPU 22 remains beneficial. In this design, the angles of the converging channels 16 and 18 with respect to the CPUs 20 and 22 are the same. In some other embodiments, as illustrated in FIG. 2, wherein both the micro coolers are in operation, the angles may be modified to have a part of the cooler stream from one of the micro coolers flow directly to the CPU 22, typically after being deflected off one of the converging plates. FIG. 2 illustrates a second exemplary cooling system 46, wherein the converging channel 16 makes an wider angle compared to that made by the converging channel 18 (with respect to the CPUs 20 and 22). In operation, the flow 19 from the micro cooler 13 flows to the CPU 20. A portion of the flow 21 from the micro cooler 14 impinges on the converging channel 16 and gets directed to the CPU 22. It should be understood by any person skilled in the art that the same configuration of the cooling system may be incorporated for one, two, or more than two CPUs.

The cooling system 2 of FIG. 1 further comprises a plurality of baffles 30 and 32 to redistribute the exit stream 24 to a remaining set of electronic components (shown, for example, as the disk drive 28 and the power supply unit 36). In one embodiment, the baffles 30 and 32 comprise one integrated structure. Baffles 30 and 32 are both vertically placed and run throughout the thickness 26 of the enclosure 4. In the specific embodiment of FIG. 1, the baffle 30 comprises a perforated plate or a mesh, which plate or mesh is substantially hollow. Substantially hollow is defined herein as having an optimized open area to allow some flow of cooling medium to move to the downstream area 34 in the enclosure 4 to cool some other electronic components (not shown). In some other embodiments, wherein flow over downstream area 34 is not as important as flow in other areas of the enclosure, the baffle 30 may alternatively be a solid sheet. In the embodiment of FIG. 1, baffle 32 is a solid sheet metal and is placed at an angle to the baffle 30. The baffle 30 acts as a deflector to move the cooling fluid to areas that need the cooling such as the power supply unit 36 and storage units such as the disc drive 28.

A portion 38 of the exit stream 24 is deflected by the perforated baffle 30 and the remaining portion passes through the baffle 30 and flows to the downstream area 34 to cool some other electronic components, if present. A portion of the deflected cooling medium 38 is blown over the disk drive 28 and once the cooling medium flows over the disk drive 28, the stream 42 flows to the power supply unit 36.

Figure 3:
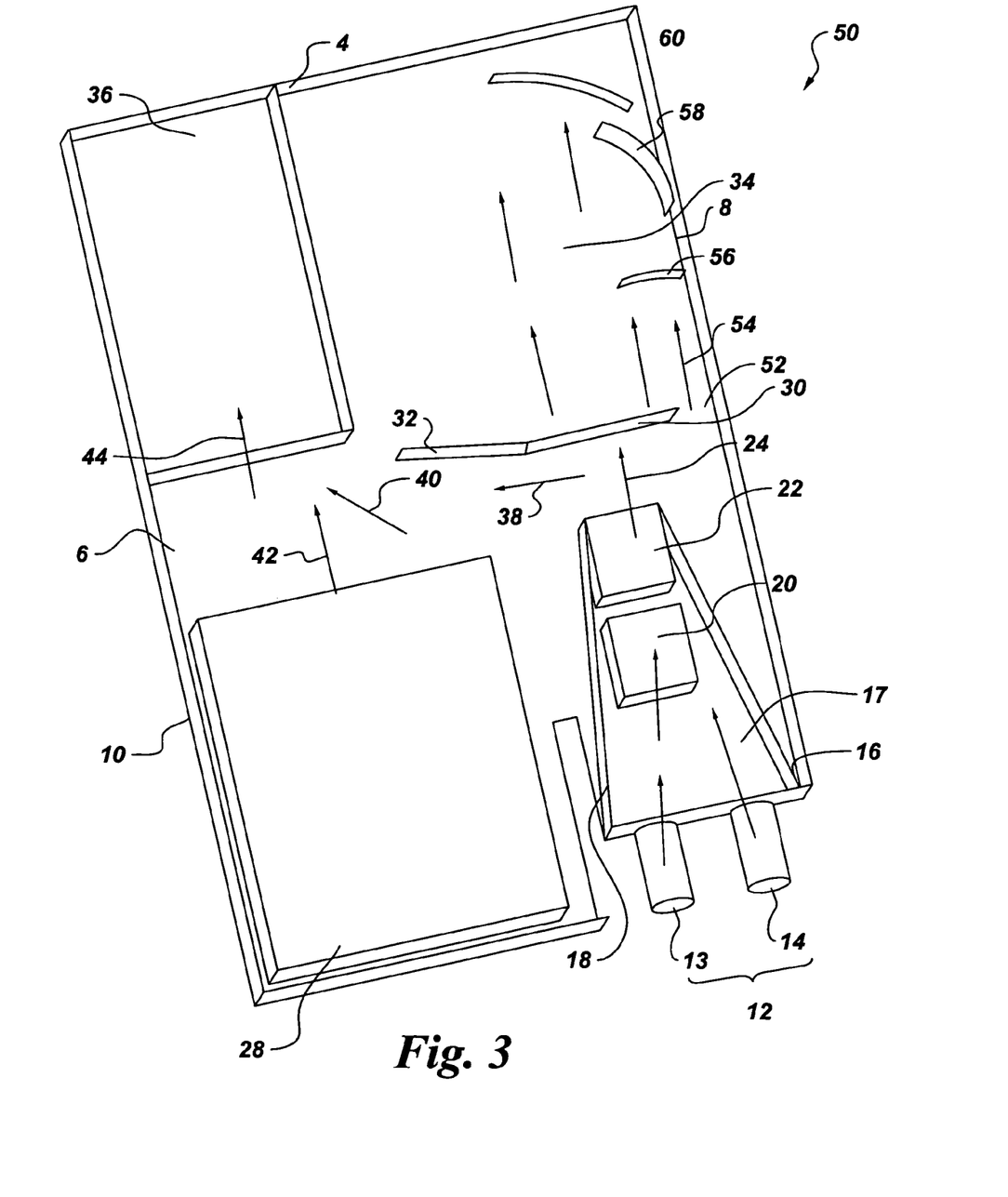
FIG. 3 illustrates a third exemplary cooling system for electronic components.

FIG. 3 illustrates a third exemplary cooling system 50 wherein enclosure 4 comprises similar electronic components as shown in FIG. 1. In the exemplary cooling system as illustrated in FIG. 3, the baffle 30 is not attached to the sidewall 8 of the enclosure 4. The baffles 32 and 30 are placed at a distance from the sidewall 8 of the enclosure 4 and create a gap 52 for the cooling medium to flow. Baffle 32 is vertically placed throughout the thickness 26 of the enclosure 4 and acts as a deflector. Baffle 30 may be a perforated plate or a mesh as mentioned in preceding sections. In this exemplary embodiment, the baffle 30 may alternatively be a solid plate depending on the cooling requirement in the downstream area 34 of the enclosure 4. One solid plate example is an embodiment wherein the cooling requirement of the downstream area 34 is adequately handled by the volume of the cooling medium passing through the gap 52. In operation, a portion of the exit stream 24 flows to the downstream area 34. The remaining portion of the exit stream 24 is deflected by the solid baffle 32 and flows over the disk drive 28 and the power supply unit 36 as shown in FIG. 2. The bypass stream 54 flowing through the gap 52 may further be deflected through a number of small baffles 56, 58 and 60, which ensure a more efficient distribution of the bypass stream 54 over the downstream area 34.

Figure 4:
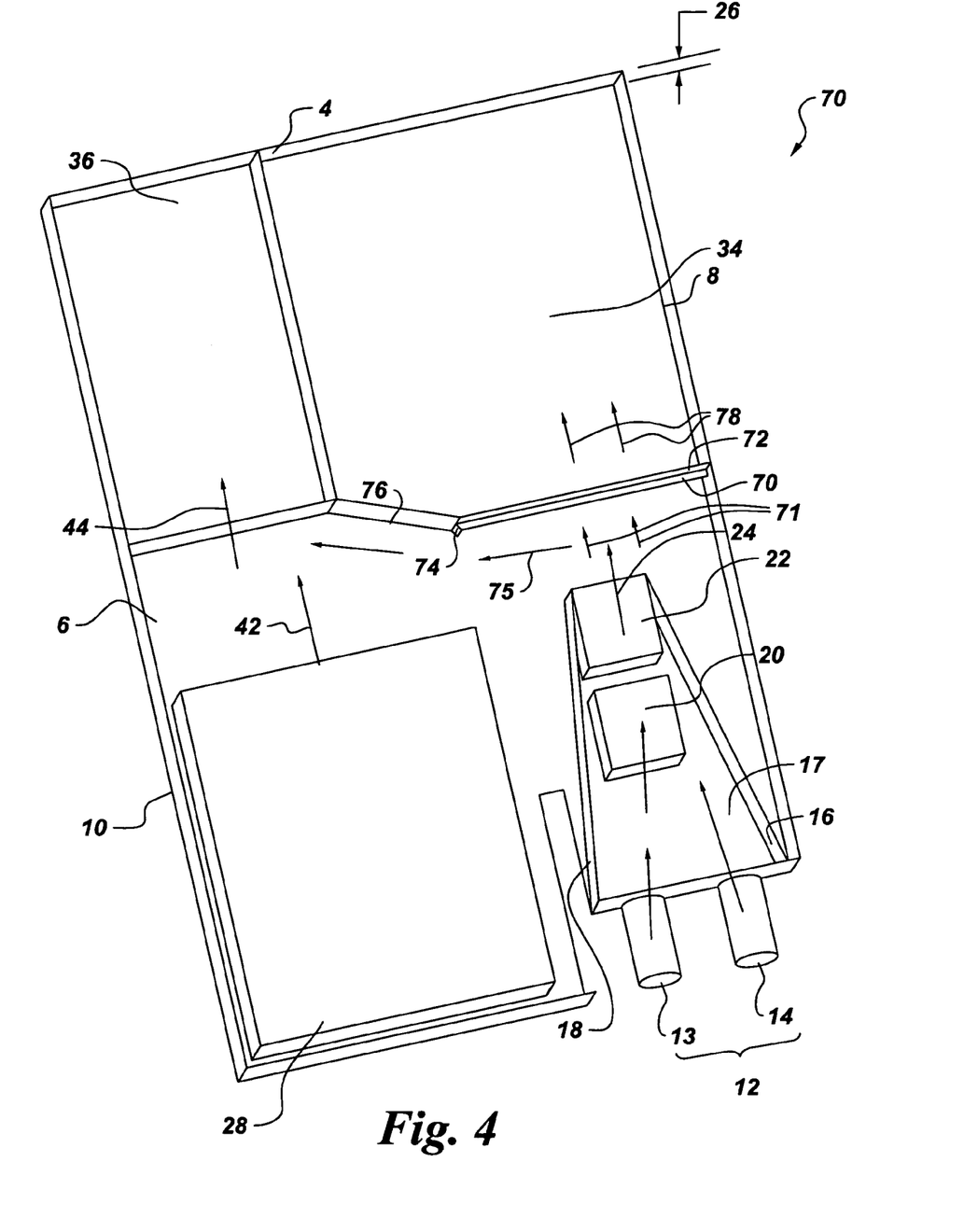
FIG. 4 illustrates a fourth exemplary cooling system for electronic components.

FIG. 4 illustrates a fourth exemplary cooling system 70 for cooling electronic components. The cooling system, as illustrated in FIG. 4, comprises three baffles, wherein the first baffle 72 is placed in a horizontal position parallelly with the flow of the cooling medium. This horizontal baffle 72 may also be designated as a horizontal splitter, which is placed at half the height 26 of the enclosure 4. The baffle 72 typically separates the exit stream 24 from the micro coolers 13 and 14 into two streams, an upper stream 71 and a lower stream 78. The horizontal baffle 72 is fixed to a second baffle 70, which baffle 70 is placed vertically. The vertical baffle 70 is fixed to the top surface (not shown) and the side-wall 8 of the enclosure 4 and to the vertical baffle 70. The horizontal baffle 72 and the second baffle 70 are connected to a third baffle 74 and a fourth baffle 76. The third baffle 74 is placed vertically and is fixed to the bottom surface 4. The height of the third baffle 74 is typically same as the height where the horizontal baffle 72 is placed. In operation, the upper stream 71 is deflected and flows over to the disk drive 28 and the power supply unit 36. The lower stream 78 continues to flow to the downstream area 34 to cool the electronics components situated in that area.

Each of the baffles in the configuration as shown in FIG. 4 contributes to the efficient redistribution of the exit stream 24 from the CPUs 20 and 22. The upper stream 71 impinges on the baffle 70, which blocks the top half of the enclosure 4 above the horizontal baffle 72. After impingement, the stream is deflected as shown by arrows 75. The fourth baffle 76 is the deflector, which baffle 76 also deflects the flow moving towards the power supply unit 36. The fourth baffle 76 may be a vertical wall joining the horizontal baffle 72 and is fixed to the bottom surface 4 of the enclosure 4. This exemplary arrangement of baffles ensures that all of the lower stream 78 moves the downstream area 34 and prevents any back mixing of stream 78 towards the power supply unit 36 or the disk drive 28.

In all the exemplary embodiments illustrated in FIGS. 1-4, the CPUs are placed in series. Alternately, the CPUs may also be placed in parallel in the downstream area 34. In this configuration, the lower stream 78 is used to cool the CPUs placed in the downstream area 34. A converging and then a diverging section (not shown) upstream of the CPUs, when the CPUs are placed in parallel ensures that the CPUs are uniformly cooled even when one of the micro coolers fail. This converging (or converging-diverging) section may have any relative position with respect to the baffles but is necessarily placed upstream of the CPUs.

Figure 5:
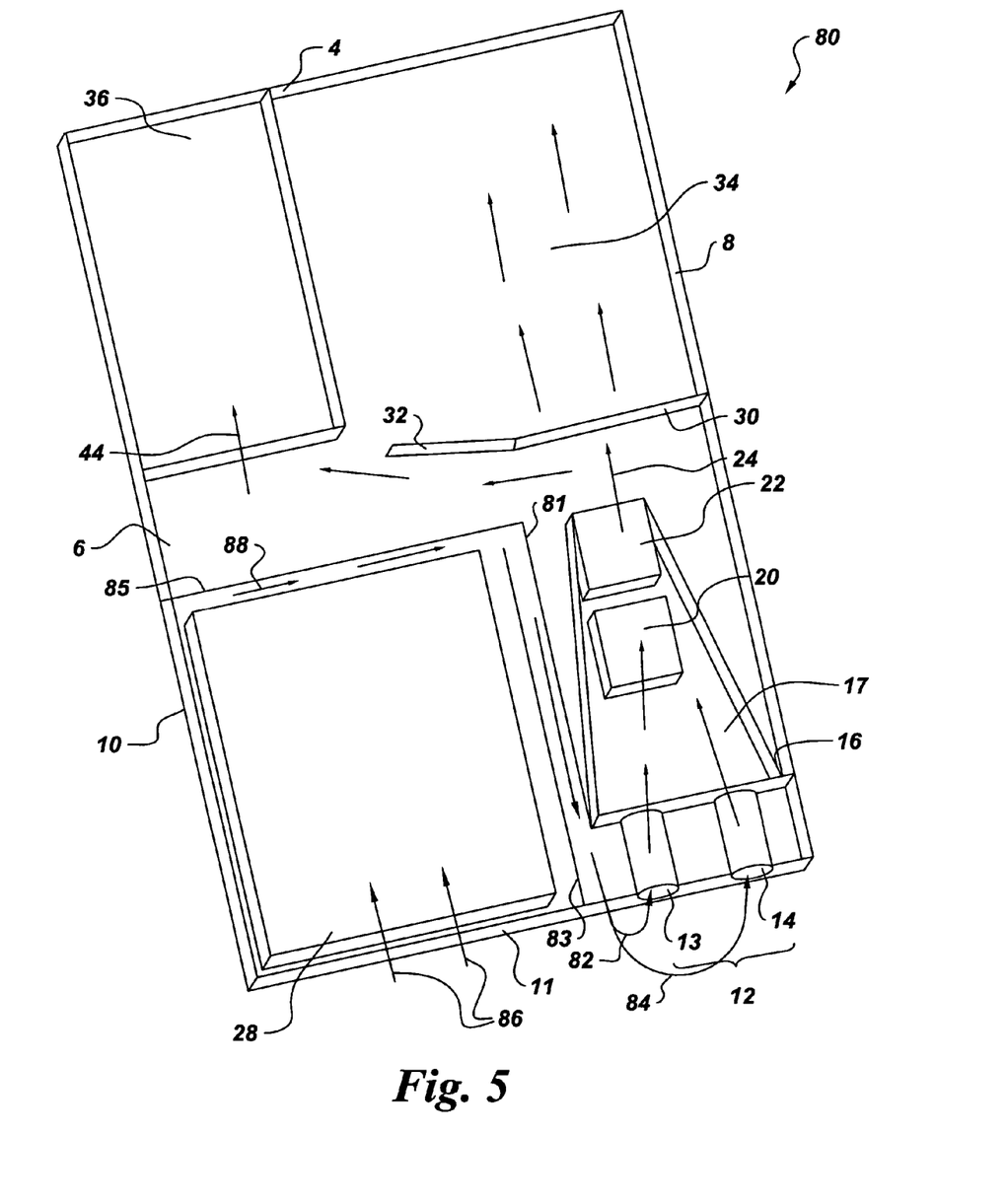
FIG. 5 illustrates a fifth exemplary cooling system for electronic components.

FIG. 5 illustrates a fifth exemplary cooling system 80 for cooling electronic components. Similar to the configuration shown in FIG. 1, the electronic components include a plurality of central processing units (CPU) 20 and 22, disk drive 28 and power supply unit 36. The cooling system 70 further comprises two baffles 83 and 81 in parallel to the CPUs and the disk drive 28, thereby creating a channel for the air-flow. In this exemplary embodiment, the micro coolers 13 and 14 are situated within the enclosure 4. Due to the suction of air, the suction side of the micro coolers 13 and 14 is at a lower pressure than ambient pressure. The wall 11 adjacent to the disk drive 28 is configured to have a plurality of opening 29 for the ambient air 86 to flow inside the enclosure 4. As the pressure across the disk drive 28 is lower than the pressure at the suction of the micro coolers, the air is sucked in through the openings in the wall 11 and gets deflected by the baffle 85. Baffles 85, 83 and 81 create a flow path 88 for re-circulation of air flow 86 back to the suction of the micro coolers 13 and 14. As shown in FIG. 5, the re-circulation flow 82 is recycled back to the suction of the micro coolers 13 and 14 through stream 82 and 84 respectively. It should be appreciated that the rectangular shape of the enclosure 4 as shown in the exemplary embodiment 80 may also be used for other baffle arrangements as shown in FIGS. 1-4 and 6-8.

Figure 6:
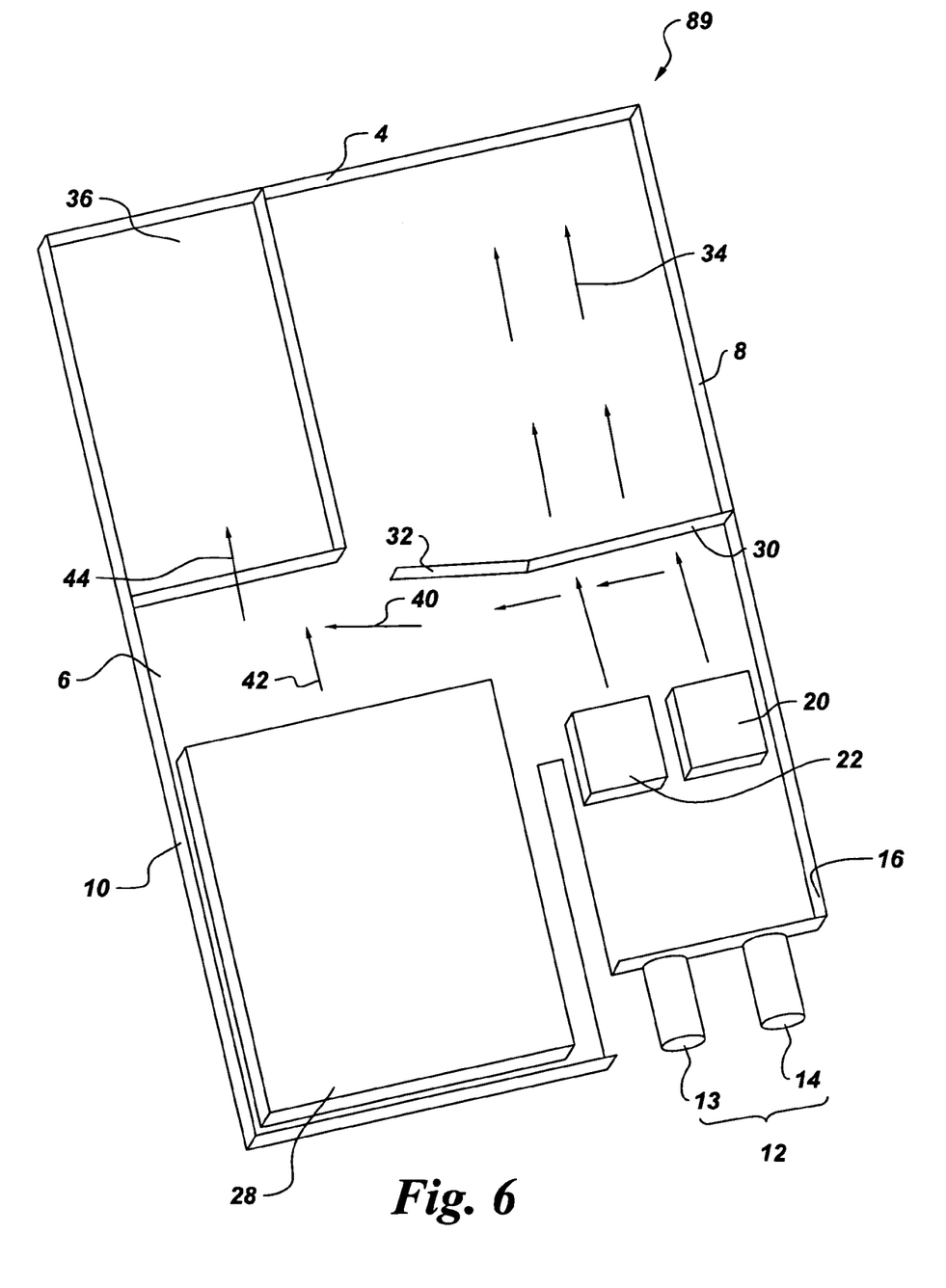
FIG. 6 illustrates a sixth exemplary cooling system for electronic components.

FIG. 6 illustrates a sixth exemplary cooling system 89, wherein the CPUs 20 and 22 are placed in parallel configuration with respect to the centralized source 12. The air from the micro coolers 13 and 14 are blown over the CPUs 20 and 22 as shown in FIG. 6.

Figure 7:
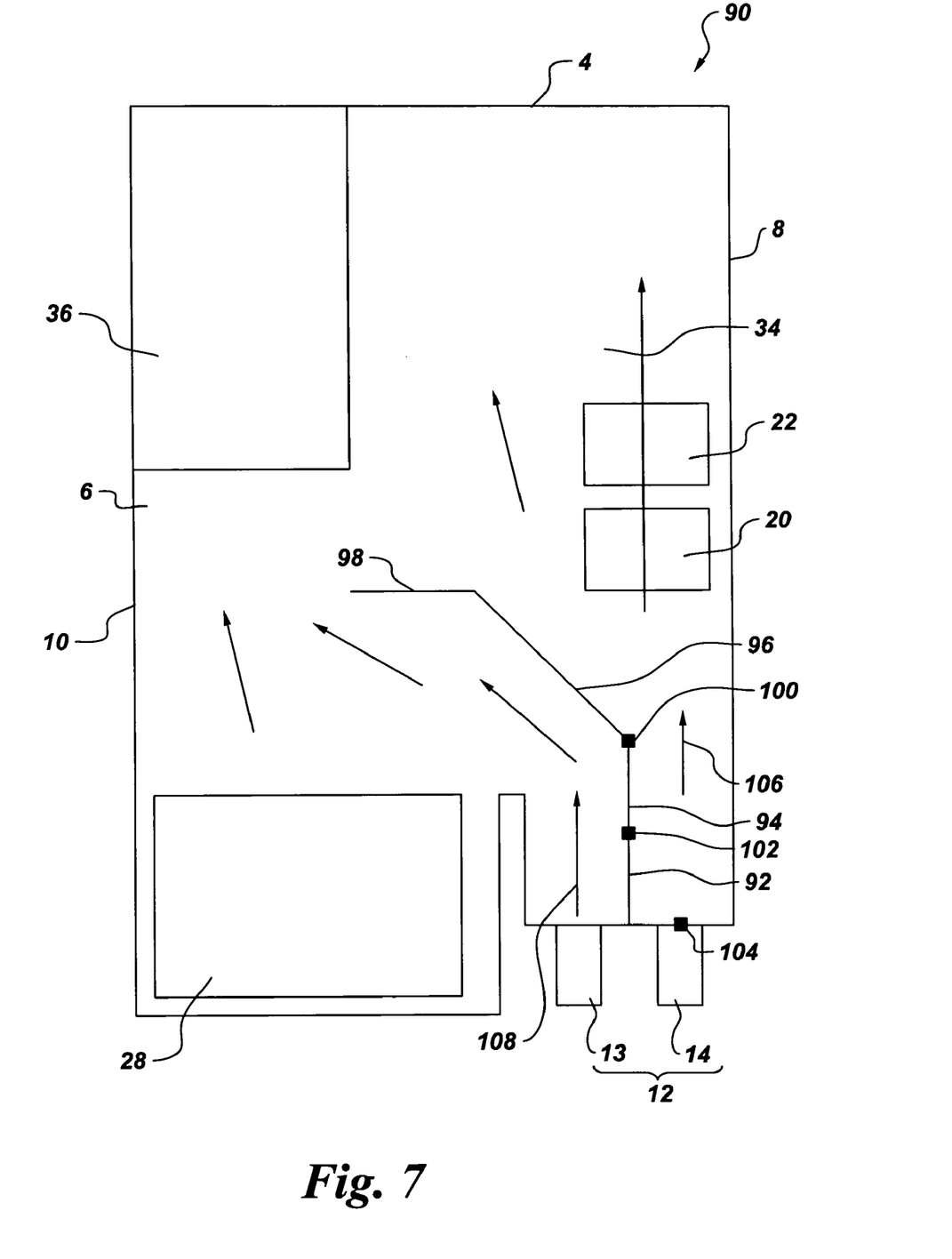
FIG. 7 illustrates a seventh exemplary cooling system for electronic components.

FIG. 7 illustrates a seventh exemplary cooling system 90 for cooling electronic components. The electronic components include a plurality of central processing units (CPUs) 20 and 22, disk drive 28 and power supply unit 36. The enclosure 4 may also comprise other components including but not limited to a graphic card. The cooling system comprises a centralized source 12 comprising two micro coolers 13 and 14. The cooling system further comprises a plurality of baffles 92, 94, 96 and 98. The baffles may comprise separate units, or alternately the baffles may comprise one integral structure. The CPUs 20 and 22 are placed in series in the downstream area 34 of the enclosure 4. The baffles 92 and 94 are placed vertically, partitioning the flow from each micro cooler 13 and 14. The flow 106 from the micro cooler 14 is blown over the CPUs 20 and 22 directly as shown in FIG. 7. The flow 108 from the micro cooler 13 is deflected by baffles 96 and 98 to flow over the disk drive 28 and the power supply unit 36. Baffle 96 may be a solid plate or perforated plate or mesh depending on the requirement of volume of the cooling medium to cool the CPUs 20 and 22. The baffles 94 and 92 may be movable about joints 100, 102 and 104 so that the positions of 94 and 92 can be adjusted in case one of the micro coolers fails in operation.

Figure 8:
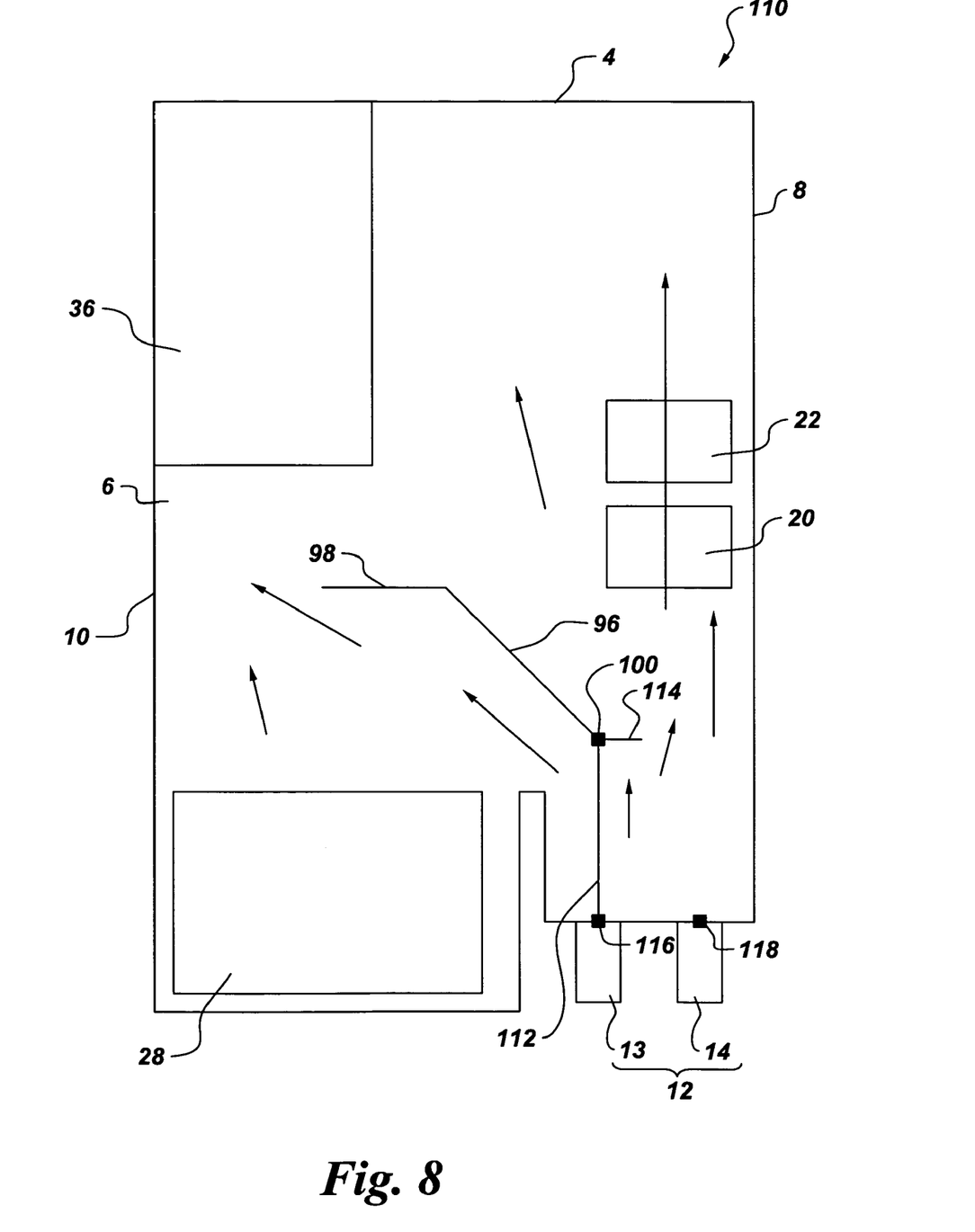
FIG. 8 illustrates an eighth exemplary cooling system for electronic components.

FIG. 8 illustrates an eighth exemplary cooling system, wherein the design of the baffles is configured to send more flow through the CPUs 20 and 22. The baffles 112, 96 and 98 are positioned at the middle of the exit 116 of the micro cooler 13. This arrangement flows one half of the flow from the micro cooler 13 and the full flow from micro cooler 14 to the CPUs 20 and 22. At joint 100, one additional baffle 114 is placed perpendicular to the flow from the micro coolers 13. The additional baffle 114 deflects the flow from the micro cooler 13 towards the CPUs 20 and 22. The baffle 112 is movable at joints 100 and 116 and 118, which is at the center of the exit of the micro cooler 14. In the exemplary embodiment, the cooling system works efficiently in case of a failure in either of the micro coolers 13 and 14. In operation, in case the micro cooler 13 fails, the baffle 112 may be moved to the position 118, which allows a portion of the operating micro cooler 14 to blow cooling medium over the disk drive 28 and the power supply unit 36 using the baffles 96 and 98. In operation, in case the micro cooler 14 fails, the design of the baffles as shown in FIG. 8 allows a portion of the flow from the operating micro cooler 13 to flow over the CPUs 20 and 22 using the additional baffle 114. In all embodiments described herein, the enclosure 4 is substantially free of stagnant recirculating pockets of the cooling medium thereby enhancing the cooling efficiency. The cooling systems described herein efficiently keep the temperature of the electronic components well within the limit, thereby enhancing the life of the components in operation. The cooling systems described herein keep the temperature of the CPUs below about 78 deg C., the disk drive 28 below about 55 deg C. and the power supply unit below about 50 deg C.

Disclosed herein are methods for cooling electronic components as described in the preceding sections. A method for cooling a plurality of electronic components comprises delivering a cooling medium from a centralized source and redistributing the cooling medium using a plurality of baffles over the electronic components.

In yet another exemplary method for cooling a plurality of electronic components comprising at least one CPU and a remaining set of electronic components, the cooling medium is generated from a centralized source. The cooling medium is first distributed over the CPUs thereby generating an exit stream. The exit stream is subsequently redistributed using a plurality of baffles over the remaining set of electronic components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore; it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A cooling system operable in a 1U application for cooling a plurality of electronic components and at least two central processing units (CPUs), said cooling system comprising:
   a centralized source configured to deliver a flow of a cooling medium; and
   a plurality of baffles configured to redistribute said cooling medium over said electronic components;
   wherein said baffles are configured to allow a portion of said flow of said cooling medium to pass through said baffles and to deflect a remaining portion;
   wherein said electronic components are situated in an enclosure downstream of said centralized source;
   wherein two of said at least two CPUs are disposed proximate each other within said flow of cooling medium originating from said centralized source and delivered to said two CPUs; and
   wherein said centralized source is capable of delivering said flow of cooling medium at sufficiently high rate to overcome pressure losses in said enclosure; and
   wherein said centralized source is capable of delivering a high flux of the cooling medium at a rate equal to or greater than 34 cubic-feet-per-minute in the 1U application.

2. The system of claim 1, wherein said electronic components are selected Worn a group consisting of a central processing unit (CPU), a disk drive, a memory curd, a graphics card, a power supply unit, and combinations thereof.

3. The system of claim 1, wherein said centralized source comprises at least two micro coolers.

4. The system of claim 1, wherein said enclosure comprises a computer server box.

5. The system of claim 1, further comprising at least two converging channels configured to direct said flow of said cooling medium over said central processing units (CPUs) prior to directing said flow to said plurality of electronic components.

6. The system in claim 5, wherein said at least two converging channels are situated at a same angle with respect to said CPUs.

7. The system of claim 1, wherein at least one of said baffles is situated substantially perpendicular to said flow of said cooling medium.

8. The system of claim 1, wherein at least one of said baffles is situated in parallel to the flow of said cooling medium.

9. The system of claim 1, wherein said baffles are fixed to said enclosure.

10. The system in claim 1, wherein said cooling medium comprises air.

11. The system of claim 1, wherein:
said enclosure is sized for 1U application; and
said centralized source comprises at least one micro cooler, each one of said at least one micro cooler comprises only one micro compressor.

12. The system of claim 1, wherein:
said plurality of baffles, disposed within said enclosure, comprises a perforated plate or a mesh.

13. The system of claim 1, wherein:
said two CPUs are disposed in series with each other within a converging duct in said flow of cooling medium.

14. The system of claim 1, wherein:
said flow of cooling medium from said centralized source is in unobstructed straight line fluid communication with said one of said two CPUs.

15. The system of claim 1, wherein:
said electronic components are situated in said enclosure downstream of said two CPUs.

16. The system of claim 1, wherein:
said plurality of baffles, disposed within said enclosure, comprises a curved baffle disposed downstream of said two CPUs.

17. The system of claim 1, wherein:
said plurality of baffles, disposed within said enclosure, comprises a plurality of straight baffles contiguously arranged to form an arcing flow path of at least a portion of said cooling medium, said contiguously arranged straight baffles being disposed downstream of said centralized source.

18. The system of claim 1, wherein:
said centralized source comprises at least one micro cooler; and
wherein said two of said at least two CPUs are disposed in series with each other within said flow of cooling medium originating from said centralized source and delivered to said two CPUs, such that said flow of cooling medium first impinges one of said two CPUs and then the other.

19. A cooling system operable in a 1U application for cooling a plurality of electronic components comprising at least two CPUs and a set of remaining electronic components, said cooling system comprising:
   a centralized source configured to deliver a flow of a cooling medium to said at least two CPUs and generate an exit stream of said cooling medium, said at least two CPUs being arranged proximate each other within said flow of cooling medium to receive said flow of cooling medium originating from said centralized source and being delivered to said CPUs; and
   a plurality of baffles configured to redistribute said exit stream to cool said remaining set of electronic components;
   wherein said at least two CPUs are serially arranged with each other within said flow of cooling medium to receive said flow of cooling medium originating from said centralized source and being delivered to said CPUs, such that said flow of cooling medium first impinges one of said at least two CPUs and then another of said at least two CPUs;
   wherein said at least two CPUs and remaining set of electronic components are situated in an enclosure downstream of said centralized source;
   wherein said centralized source is capable of delivering said flow of cooling medium at sufficiently high rate to overcome pressure losses in said enclosure; and
   wherein said centralized source is capable of delivering a high flux of the cooling medium at a rate equal to or greater than 34 cubic-feet-per-minute in the 1U application.

20. The system of claim 19, wherein said set of remaining electronic components comprises at least one unit consisting of a disk drive, a memory card, a graphics card, a power supply unit or combinations thereof.

21. The system of claim 19, wherein said centralized source comprises at least one micro cooler.

22. The system of claim 19, wherein said centralized source comprises at least two micro coolers.

23. The system of claim 19, wherein said enclosure comprises a computer server box.

24. The system of claim 19 further comprising at least two converging channels configured to direct said flow of said cooling medium over said central processing units (CPUs) prior to directing said flow to said remaining set of electronic components.

25. The system in claim 24, wherein said at least two converging channels are situated at a same angle with respect to said CPUs.

26. The system of claim 19, wherein said baffles are configured to allow a portion of said exit stream to pass through said baffles and to deflect a remaining portion.

27. The system of claim 19, wherein at least one of said baffles is situated substantially perpendicular to said exit stream.

28. The system of claim 19, wherein at least one of said baffles is situated in parallel to said exit stream.

29. The system of claim 19, wherein said baffles are fixed to said enclosure.

30. The system in claim 19, wherein said cooling medium comprises air.

31. The system of claim 19, wherein:
at least one of said plurality of baffles is disposed in flow communication with said exit stream such that said exit stream is redistributed subsequent to cooling said at least two CPUs and prior to cooling said remaining set of electronic components.

32. A method for cooling in a 1U application a plurality of electronic components comprising at least two central processing units (CPUs) disposed proximate each other within a cooling medium flow path within an enclosure, and a set of remaining electronic components disposed downstream of the at least two CPUs, said method comprising:
delivering a cooling medium from a centralized source disposed upstream of said electronic components, said centralized source comprising at least one micro cooler; and
downstream of said CPUs redistributing said cooling medium using a plurality of baffles over said set of remaining electronic components;
wherein said delivering comprises delivering a flow of cooling medium first to one of said at least two CPUs and then to a second of said at least two CPUs, the first and second CPUs being disposed in series with each other in the flow of cooling medium;
wherein said delivering comprises delivering a flow of cooling medium from a centralized source at sufficiently high rate to overcome pressure losses in the enclosure; and
wherein said delivering comprises delivering a high flux of the cooling medium at a rate equal to or greater than 34 cubic-feet-per-minute in the 1U application.

33. The method of claim 32, wherein said electronic components are selected from a group consisting of a central processing unit (CPU), a disk drive, a memory card, a graphics card, power supply unit and combinations thereof.

34. A cooling system for cooling a plurality of electronic components and at least two central processing units (CPUs), said cooling system comprising:
a centralized source comprising at least one micro cooler configured to deliver a flow of a cooling medium; and
a plurality of baffles configured to redistribute said cooling medium over said electronic components;
wherein said electronic components are situated in an enclosure downstream of said centralized source;
wherein two of said at least two CPUs are disposed in series with each other within said flow of cooling medium originating from said centralized source and delivered to said two CPUs, such that said flow of cooling medium first impinges one of said two CPUs and then the other;
wherein said centralized source is capable of delivering said flow of cooling medium at sufficiently high rate to overcome pressure losses in said enclosure; and
wherein said baffles are configured to allow a portion of said flow of said cooling medium to pass through said baffles and to deflect a remaining portion.

35. The system of claim 34 being operable for cooling in a 1U application, wherein:
said centralized source is capable of delivering a high flux of the cooling medium at a rate equal to or greater than 34 cubic-feet-per-minute in the 1U application.

36. A cooling system for cooling a plurality of electronic components comprising at least two CPUs and a set of remaining electronic components, said cooling system comprising:
a centralized source configured to deliver a flow of a cooling medium to said at least two CPUs and generate an exit stream of said cooling medium, said at least two CPUs being serially arranged with each other within said flow of cooling medium to receive said flow of cooling medium originating from said centralized source and being delivered to said CPUs, such that said flow of cooling medium first impinges one of said at least two CPUs and then another of said at least two CPUs; and
a plurality of baffles configured to redistribute said exit stream to cool said remaining set of electronic components;
wherein said at least two CPUs and remaining set of electronic components are situated in an enclosure downstream of said centralized source;
wherein said centralized source is capable of delivering said flow of cooling medium at sufficiently high rate to overcome pressure losses in said enclosure; and
wherein said baffles are configured to allow a portion of said exit stream to pass through said baffles and to deflect a remaining portion.

37. The system of claim 36 being operable for cooling in a 1U application, wherein:
said centralized source is capable of delivering a high flux of the cooling medium at a rate equal to or greater than 34 cubic-feet-per-minute in the 1U application.

38. A cooling system for cooling a plurality of electronic components and at least two central processing units (CPUs), said cooling system comprising:
a centralized source comprising at least one micro cooler configured to deliver a flow of a cooling medium; and
a plurality of baffles configured to redistribute said cooling medium over said electronic components;
wherein said electronic components are situated in an enclosure downstream of said centralized source;
wherein two of said at least two CPUs are disposed in series with each other within said flow of cooling medium originating from said centralized source and delivered to said two CPUs, such that said flow of cooling medium first impinges one of said two CPUs and then the other;
wherein said centralized source is capable of delivering said flow of cooling medium at sufficiently high rate to overcome pressure losses in said enclosure; and
wherein said plurality of baffles, disposed within said enclosure, comprises a perforated plate or a mesh.

39. The system of claim 38 being operable for cooling in a 1U application, wherein:
said centralized source is capable of delivering a high flux of the cooling medium at a rate equal to or greater than 34 cubic-feet-per-minute in the 1U application.

40. A cooling system for cooling a plurality of electronic components and at least two central processing units (CPUs), said cooling system comprising:
a centralized source comprising at least one micro cooler configured to deliver a flow of a cooling medium; and
a plurality of baffles configured to redistribute said cooling medium over said electronic components;
wherein said electronic components are situated in an enclosure downstream of said centralized source;
wherein two of said at least two CPUs are disposed in series with each other within said flow of cooling medium originating from said centralized source and delivered to said two CPUs, such that said flow of cooling medium first impinges one of said two CPUs and then the other;
wherein said centralized source is capable of delivering said flow of cooling medium at sufficiently high rate to overcome pressure losses in said enclosure; and
wherein said two CPUs are disposed in series with each other within a converging duct in said flow of cooling medium.

41. The system of claim 40 being operable for cooling in a 1U application, wherein:
said centralized source is capable of delivering a high flux of the cooling medium at a rate equal to or greater than 34 cubic-feet-per-minute in the 1U application.

42. A cooling system for cooling a plurality of electronic components and at least two central processing units (CPUs), said cooling system comprising:
a centralized source comprising at least one micro cooler configured to deliver a flow of a cooling medium; and
a plurality of baffles configured to redistribute said cooling medium over said electronic components;
wherein said electronic components are situated in an enclosure downstream of said centralized source;
wherein two of said at least two CPUs are disposed in series with each other within said flow of cooling medium originating from said centralized source and delivered to said two CPUs, such that said flow of cooling medium first impinges one of said two CPUs and then the other;
wherein said centralized source is capable of delivering said flow of cooling medium at sufficiently high rate to overcome pressure losses in said enclosure; and
wherein said plurality of baffles, disposed within said enclosure, comprises a curved baffle disposed downstream of said two CPUs.

43. The system of claim 42 being operable for cooling in a 1U application, wherein:
said centralized sources capable of delivering a high flux of the cooling medium at a rate equal to or greater than 34 cubic-feet-per-minute in the 1U application.

* * * * *